(12) United States Patent
Park

(10) Patent No.: US 12,528,113 B2
(45) Date of Patent: Jan. 20, 2026

(54) SEALED PORTION FOLDING APPARATUS AND METHOD FOR POUCH-SHAPED BATTERY CELLS

(71) Applicant: LG Energy Solution, Ltd., Seoul (KR)

(72) Inventor: Song Yi Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/837,697

(22) PCT Filed: Aug. 30, 2023

(86) PCT No.: PCT/KR2023/012836
§ 371 (c)(1),
(2) Date: Aug. 12, 2024

(87) PCT Pub. No.: WO2024/063369
PCT Pub. Date: Mar. 28, 2024

(65) Prior Publication Data
US 2025/0135524 A1    May 1, 2025

(30) Foreign Application Priority Data

Sep. 22, 2022  (KR) .................. 10-2022-0119747
Jul. 26, 2023  (KR) .................. 10-2023-0097591

(51) Int. Cl.
*B21D 39/02*   (2006.01)
*H01M 50/105*  (2021.01)

(52) U.S. Cl.
CPC .......... *B21D 39/02* (2013.01); *H01M 50/105* (2021.01)

(58) Field of Classification Search
CPC ..... B21D 39/02; B29C 66/0324; B29C 53/04; B29C 53/06; B29C 53/063; H01M 10/0404; B23B 3/04
See application file for complete search history.

(56) References Cited

U.S. PATENT DOCUMENTS

2016/0049682 A1  2/2016 Won et al.
2021/0074989 A1  3/2021 Han et al.
(Continued)

FOREIGN PATENT DOCUMENTS

DE   102012107215 A1 *  2/2014  ............ B29C 66/43
JP   2001-160379 A       6/2001
(Continued)

OTHER PUBLICATIONS

Machine translation of DE-102012107215-A1 (Year: 2014).*
International Search Report for Application No. PCT/KR2023/012836 mailed Nov. 30, 2023 .3 pgs.

*Primary Examiner* — Kyle A Cook
(74) *Attorney, Agent, or Firm* — Lerner David LLP

(57) ABSTRACT

The present invention relates to a sealed portion folding apparatus and method for pouch-shaped battery cells, and more particularly to a sealed portion folding apparatus for pouch-shaped battery cells including a lower unit configured to allow a sealed portion to be seated thereon. The lower unit includes a lower folding block configured to perform horizontal reciprocation and upward and downward movement, an upper unit including an upper folding block configured to perform horizontal reciprocation and upward and downward movement and to press the sealed portion so as to be bent to a predetermined angle, a lower folding guide unit configured to perform upward and downward movement and to guide the sealed portion so as to be bent to a predetermined angle, and an upper folding guide unit configured to perform upward and downward movement and to guide the sealed portion so as to be bent to a predetermined angle.

13 Claims, 16 Drawing Sheets

(56) References Cited

U.S. PATENT DOCUMENTS

| | | | |
|---|---|---|---|
| 2023/0369632 A1* | 11/2023 | Kim | H01M 50/136 |
| 2024/0291013 A1* | 8/2024 | Noh | B29C 53/36 |
| 2025/0149696 A1* | 5/2025 | Ahn | B29C 66/1312 |
| 2025/0201894 A1* | 6/2025 | Cho | B29C 65/1416 |

FOREIGN PATENT DOCUMENTS

| | | |
|---|---|---|
| JP | 2021508141 A | 2/2021 |
| KR | 2015-0025687 A | 3/2015 |
| KR | 2016-0133041 A | 11/2016 |
| KR | 101958882 B1 | 3/2019 |
| KR | 101974443 B1 | 5/2019 |
| KR | 102148997 B1 | 8/2020 |
| KR | 2022-0092102 A | 7/2022 |
| KR | 2022-0115028 A | 8/2022 |
| KR | 2022-0127145 A | 9/2022 |

* cited by examiner

[FIG. 1]
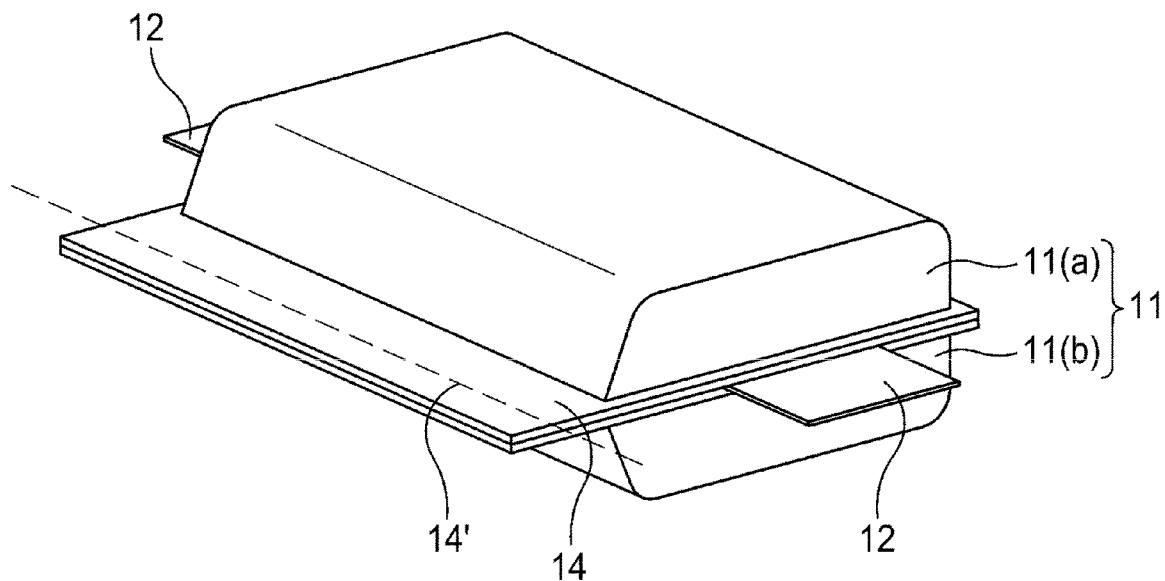
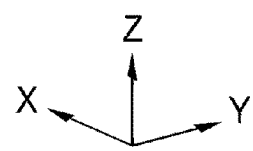

[FIG. 2]
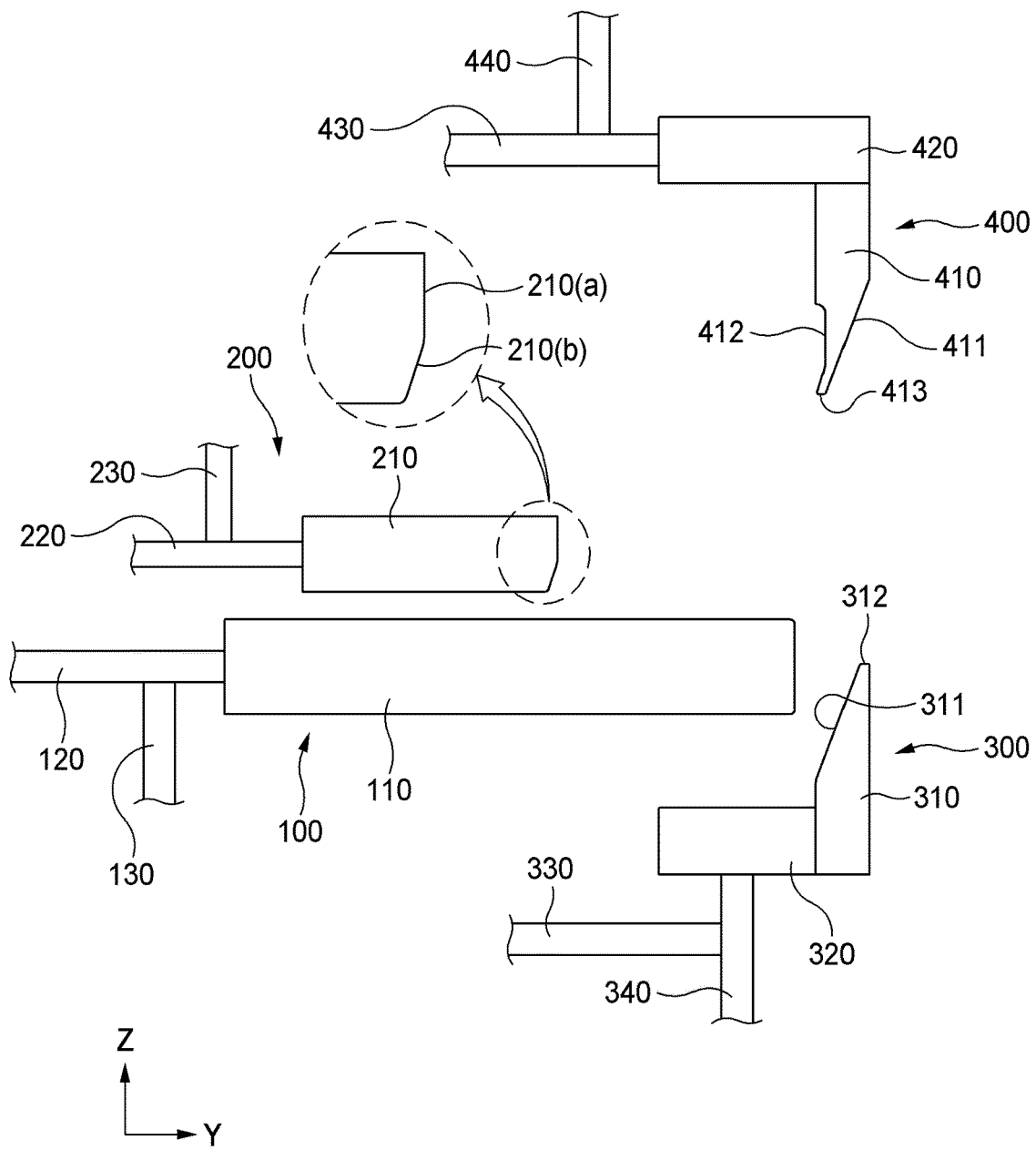

[FIG. 3]
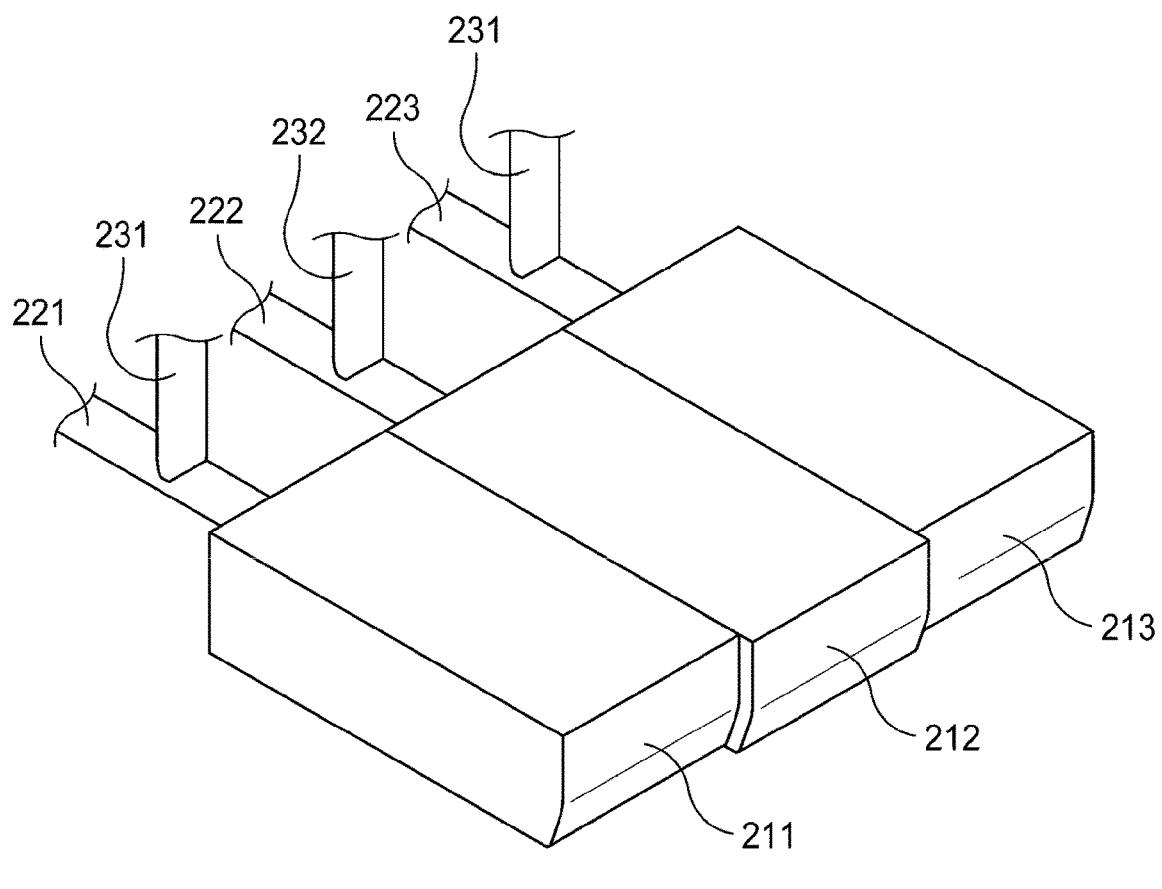

[FIG. 4]
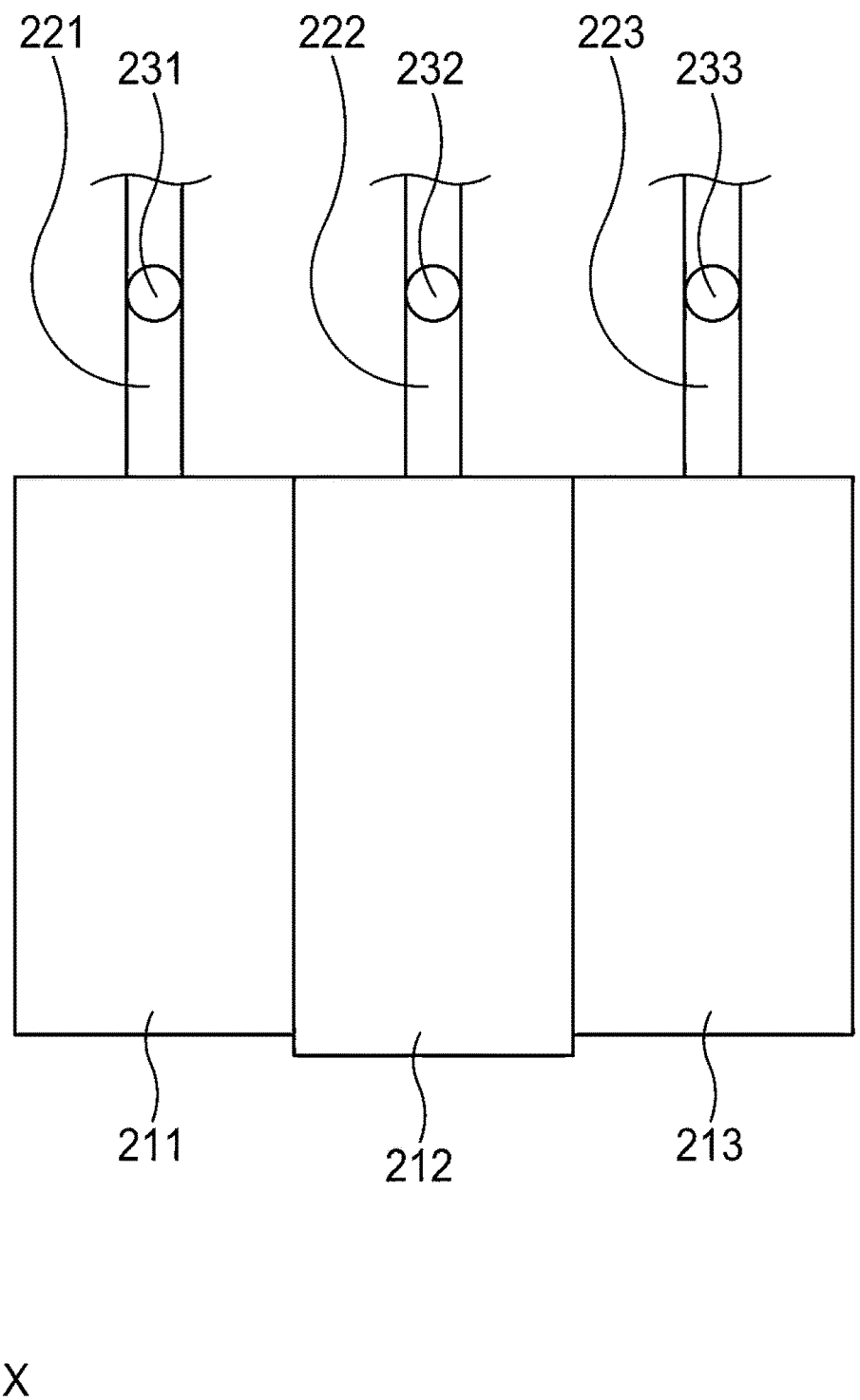

[FIG. 5]
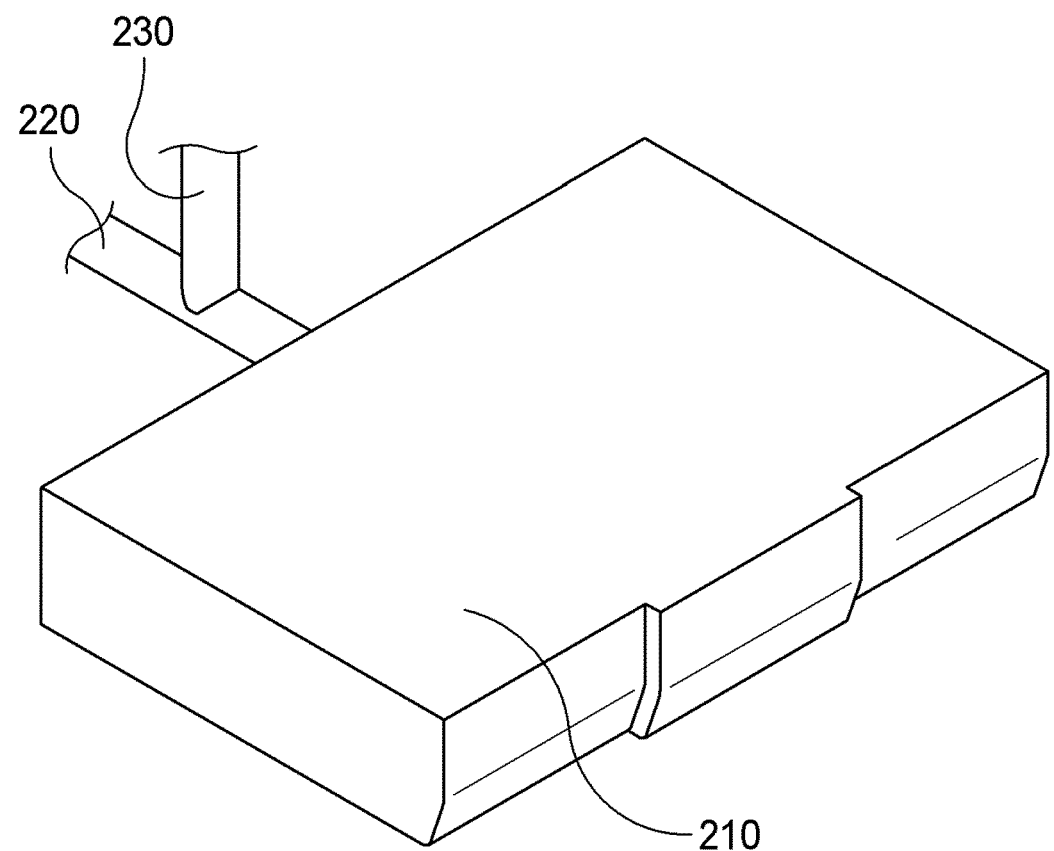

[FIG. 6]
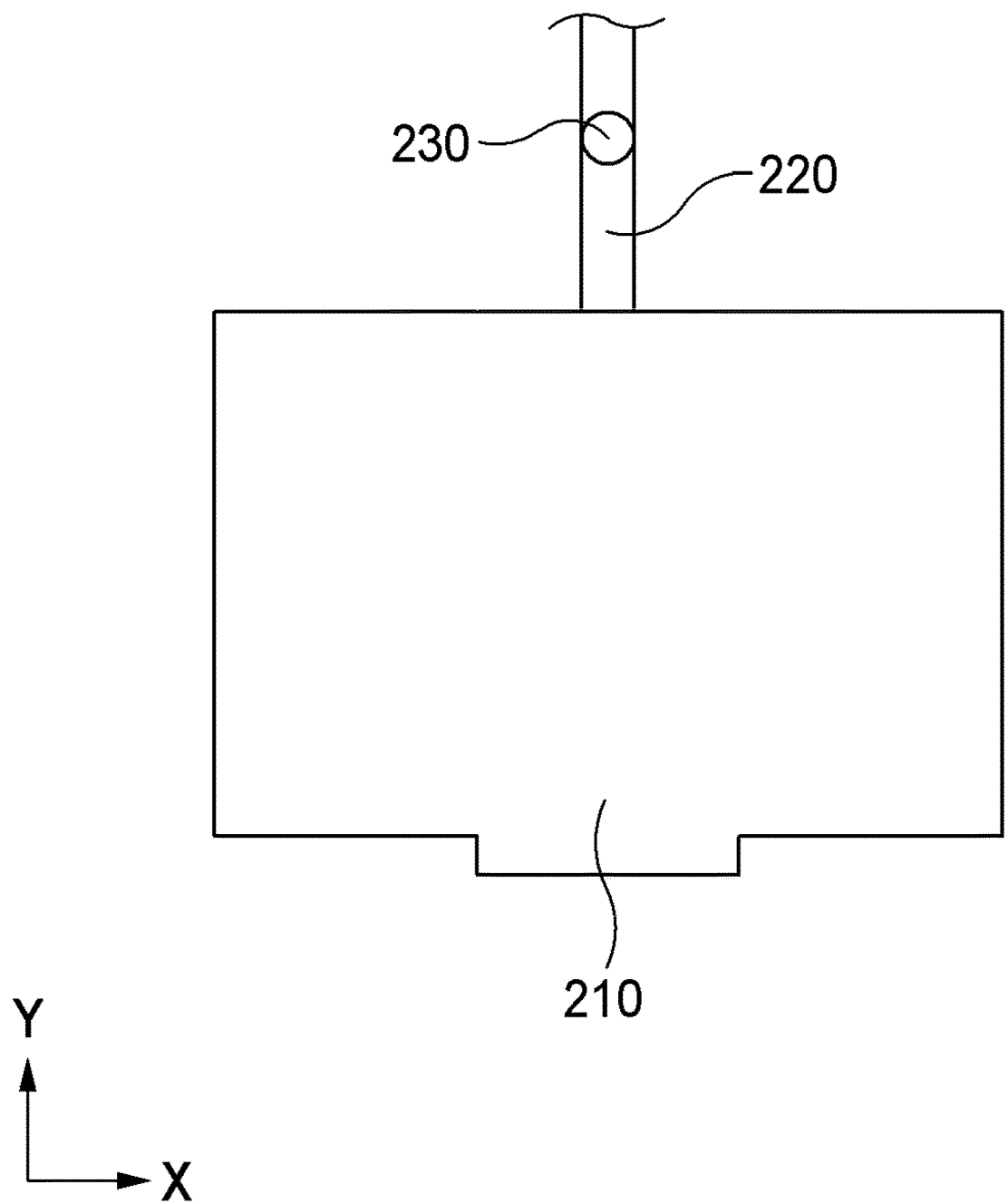

[FIG. 7]
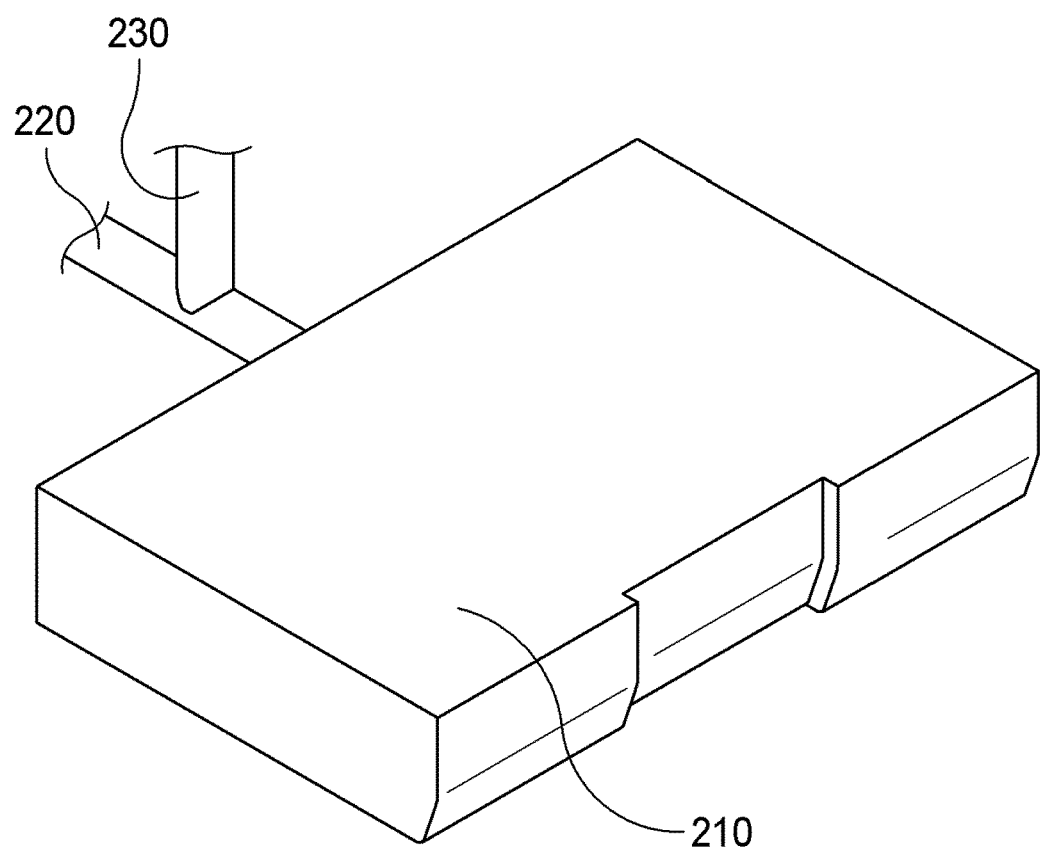

[FIG. 8]
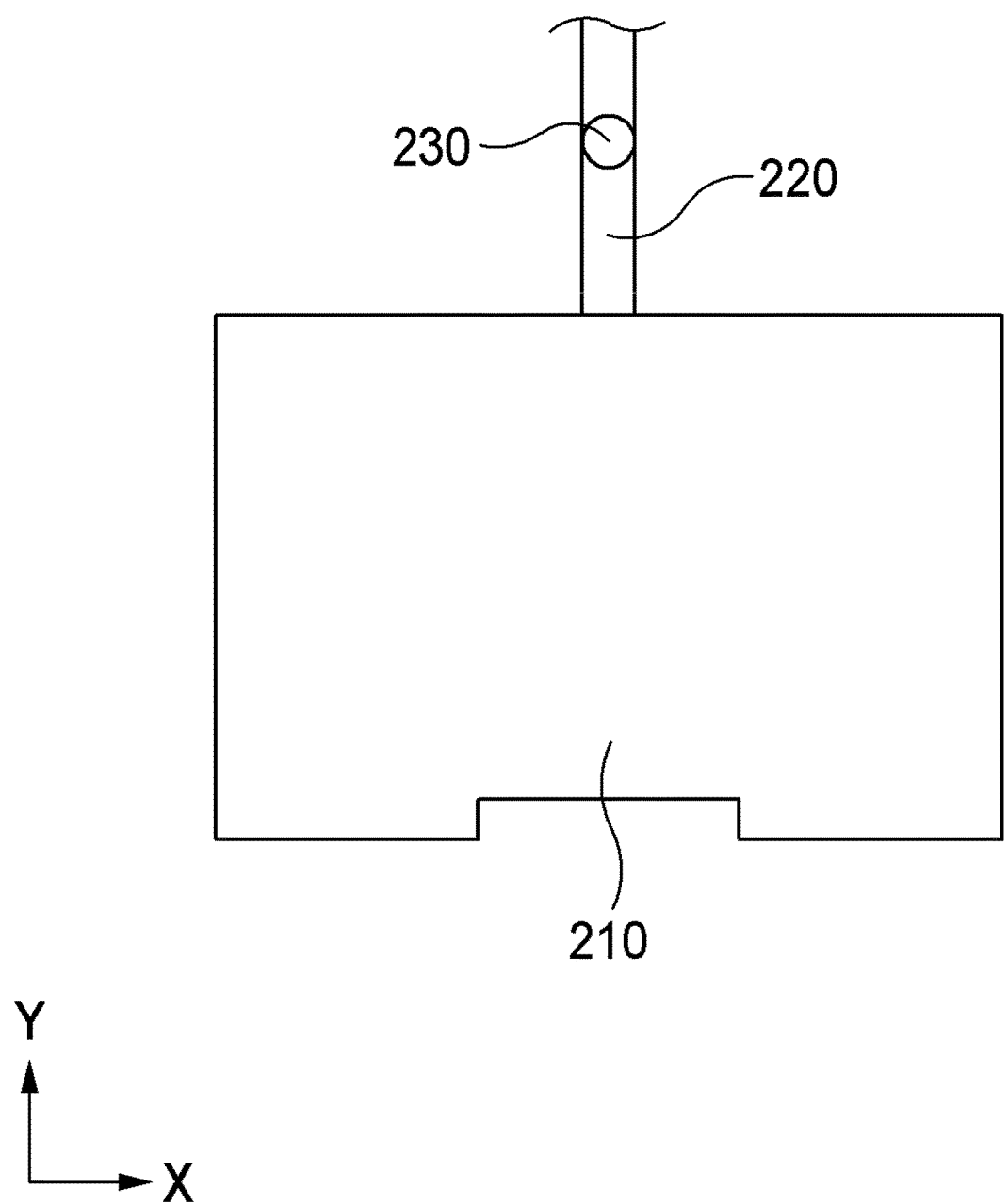

[FIG. 9]
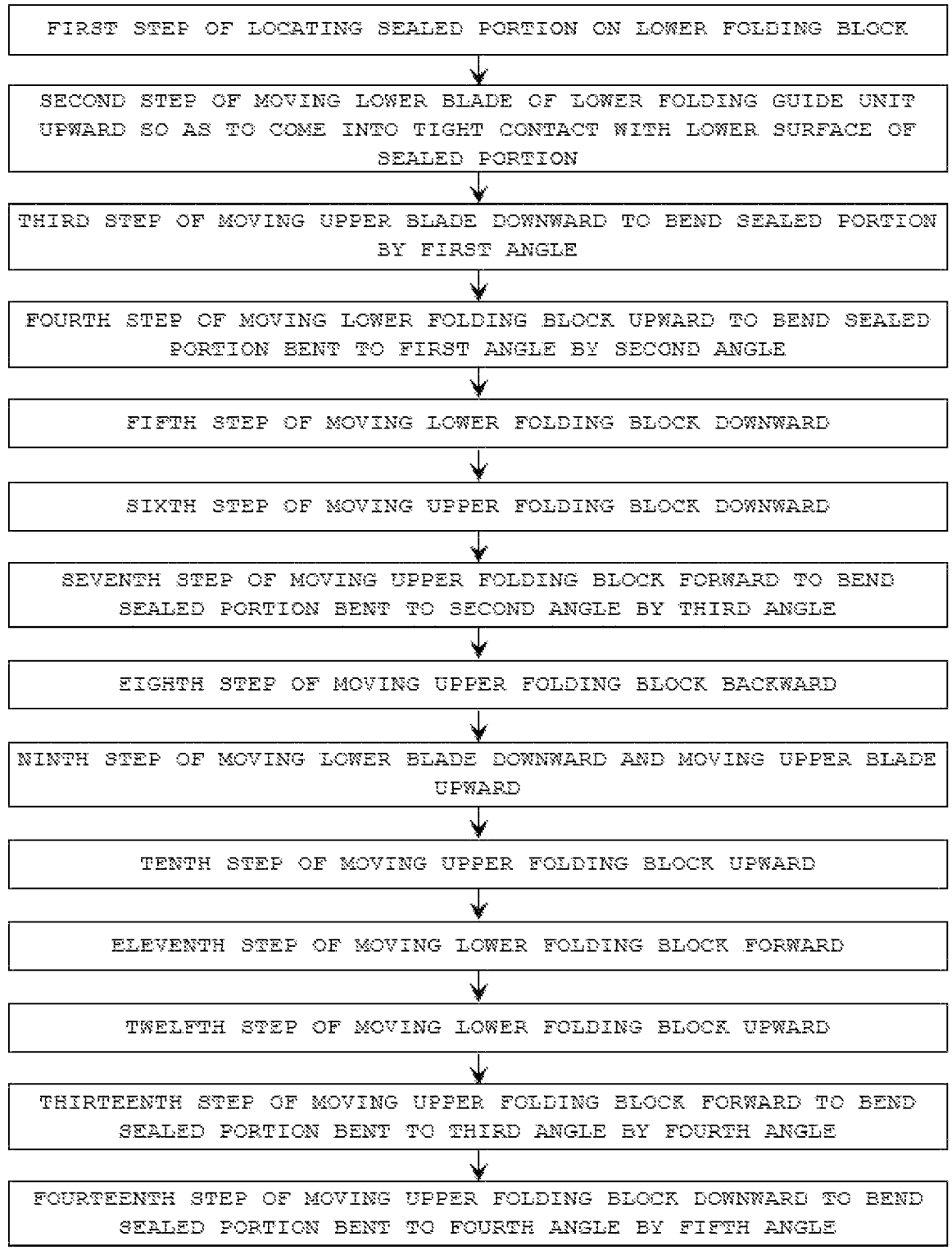

【FIG. 10】
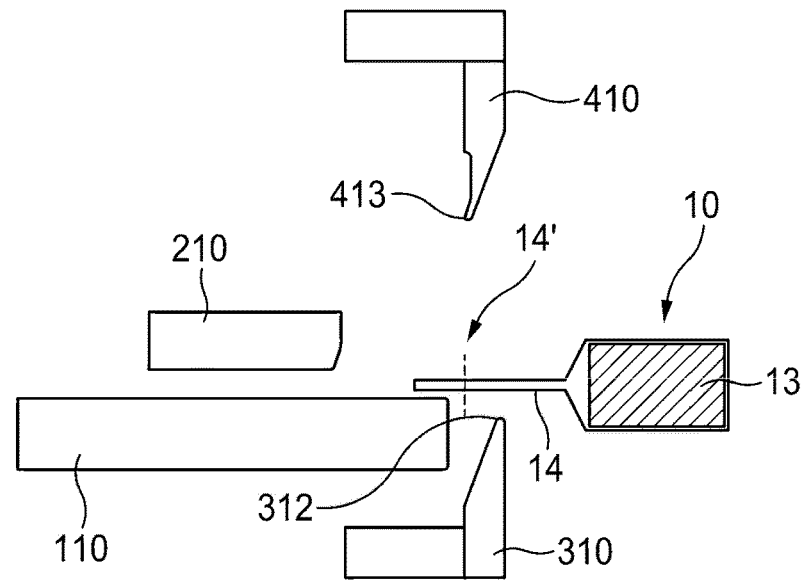
(a)
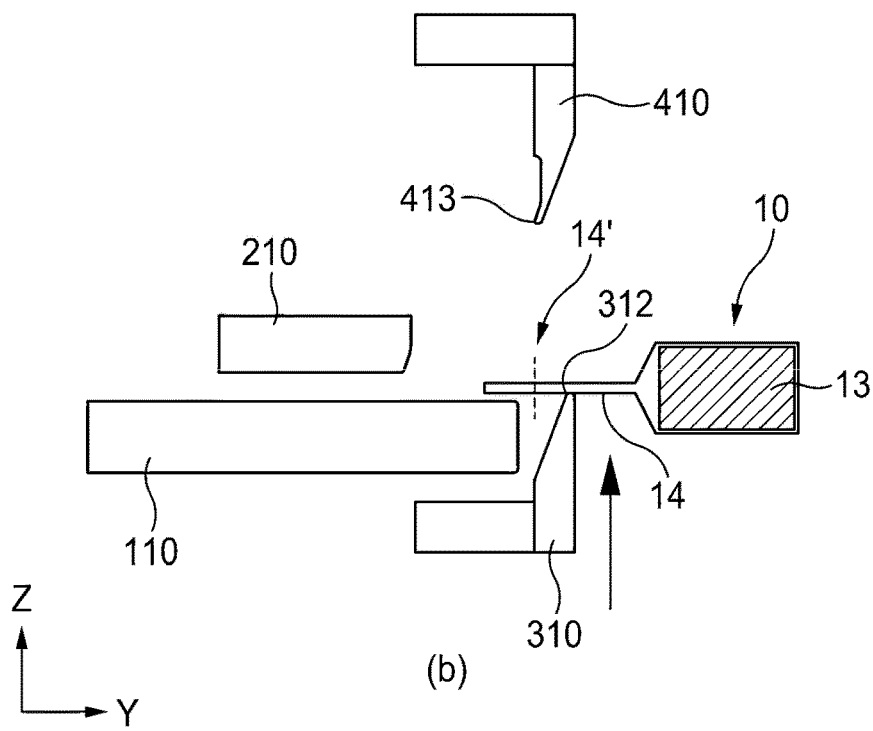
(b)

[FIG. 11]
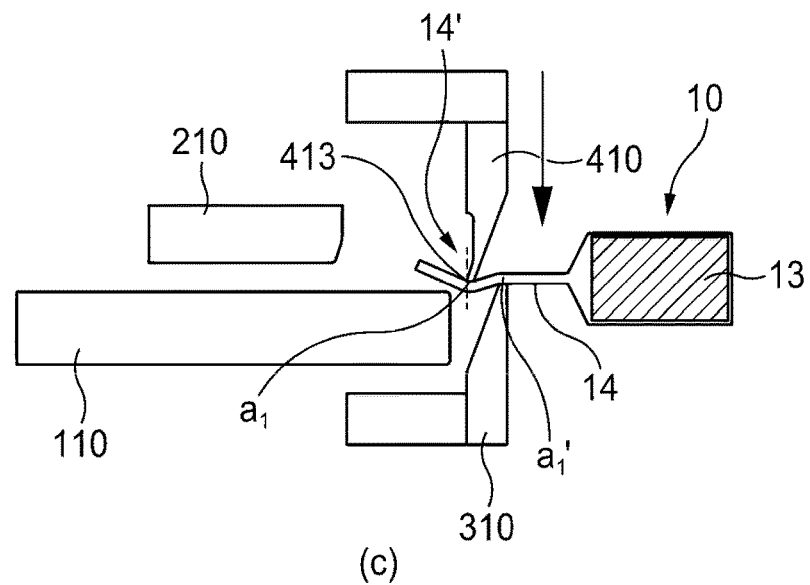
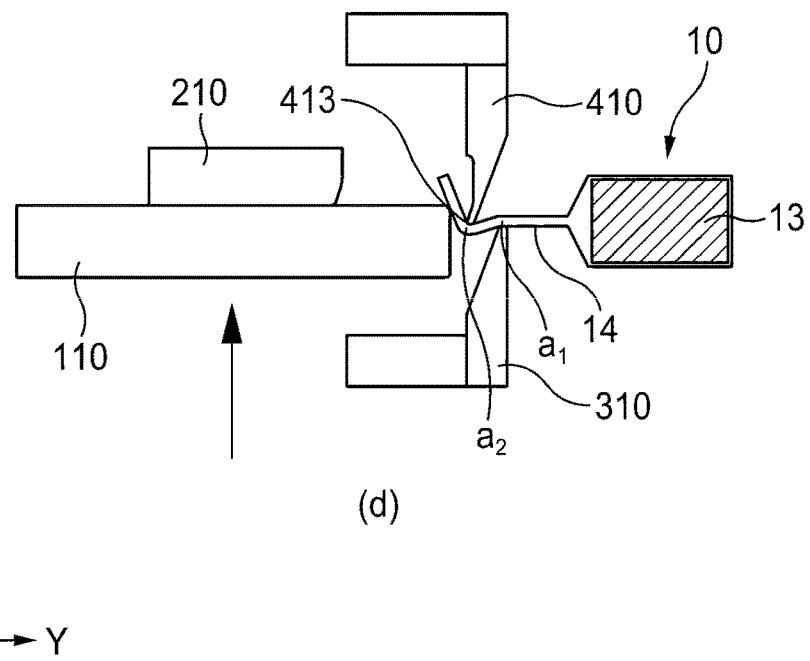

[FIG. 12]
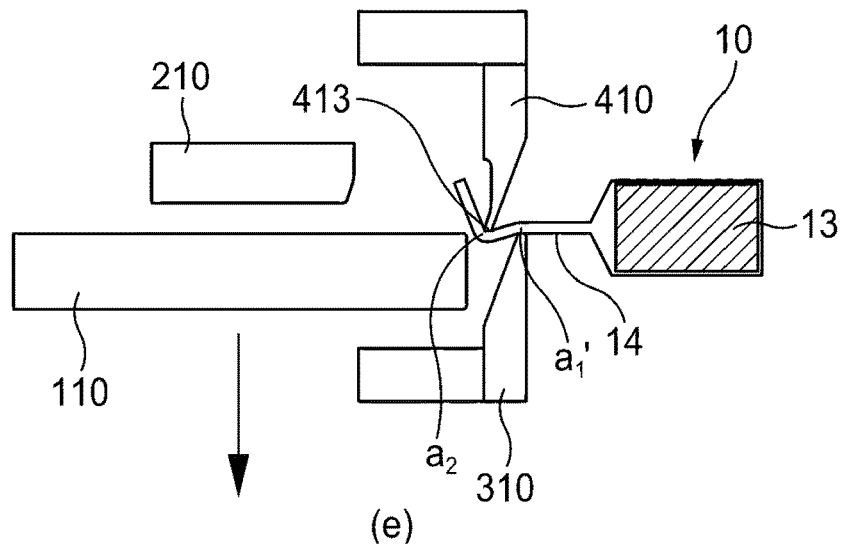
(e)
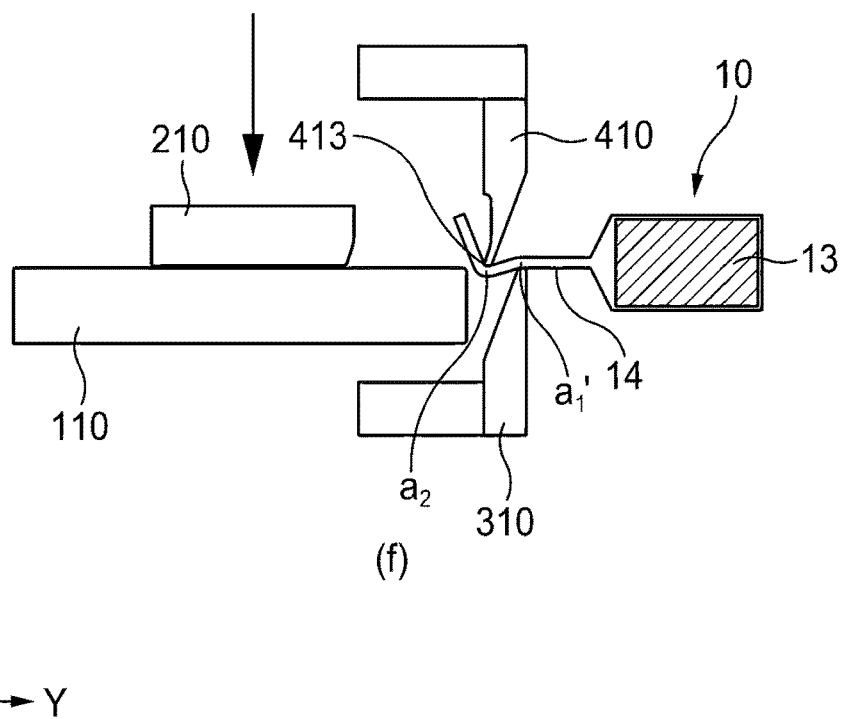
(f)

【FIG. 13】
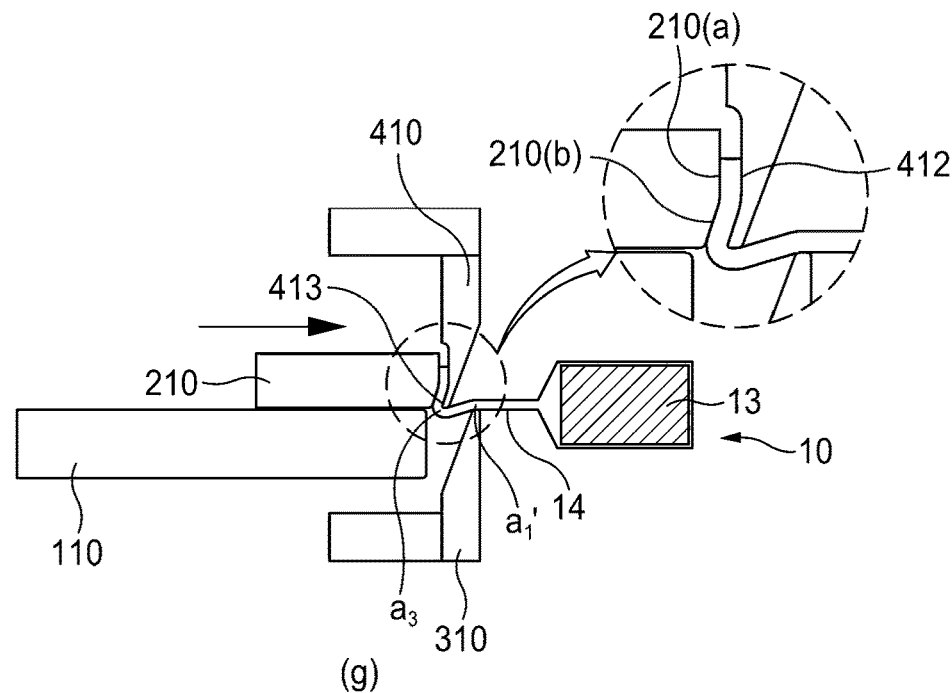
(g)
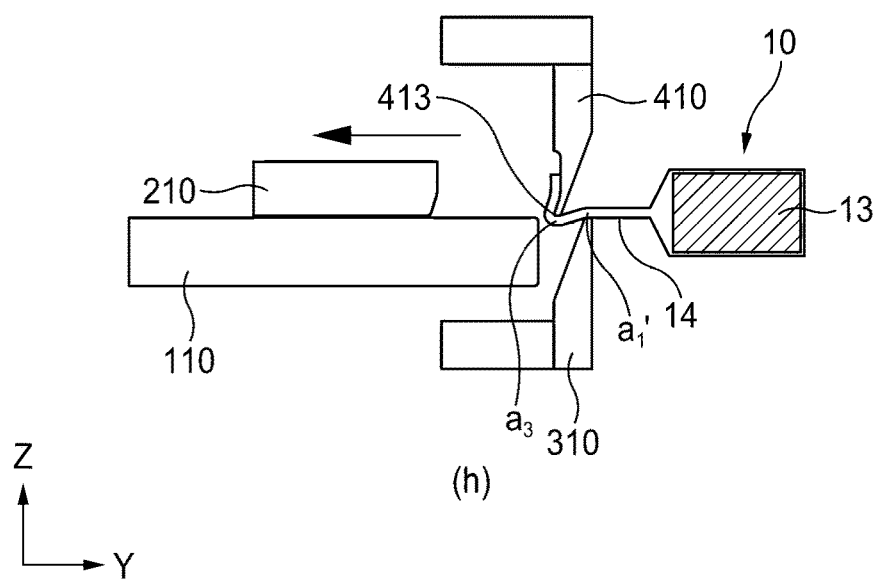
(h)

【FIG. 14】
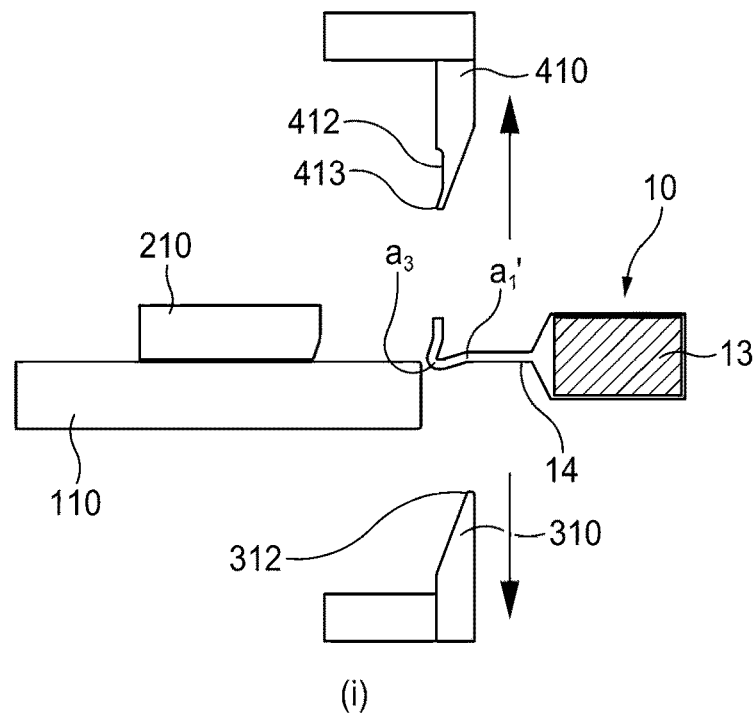
(i)
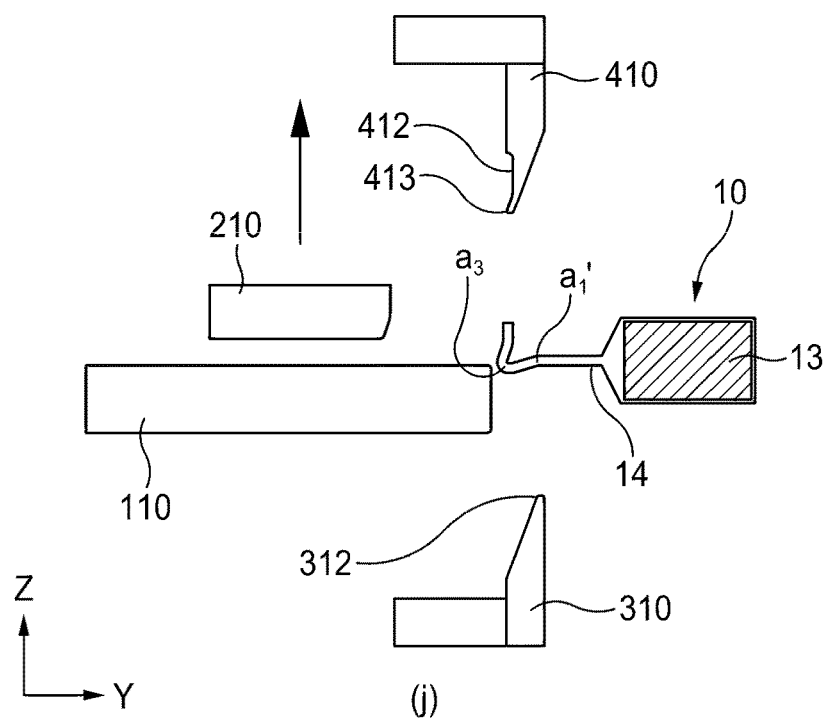
(j)

【FIG. 15】
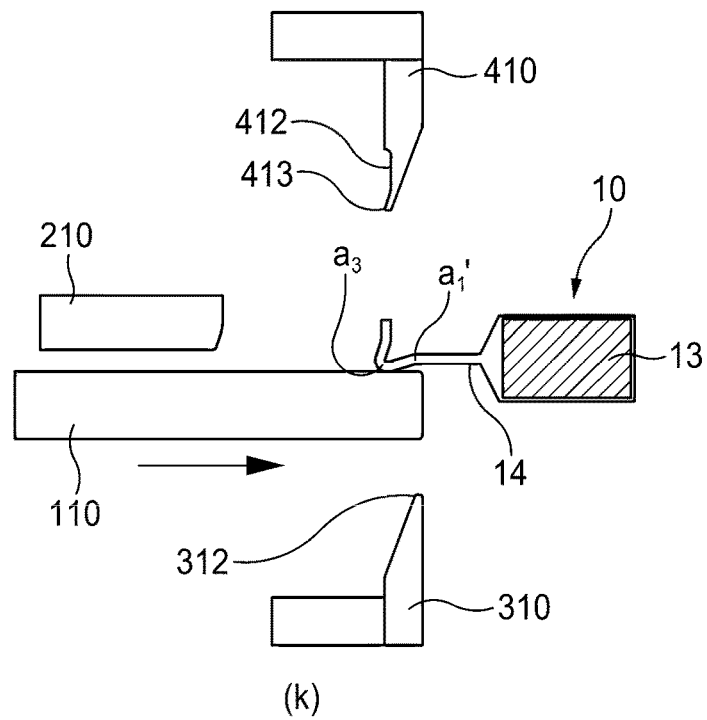
(k)
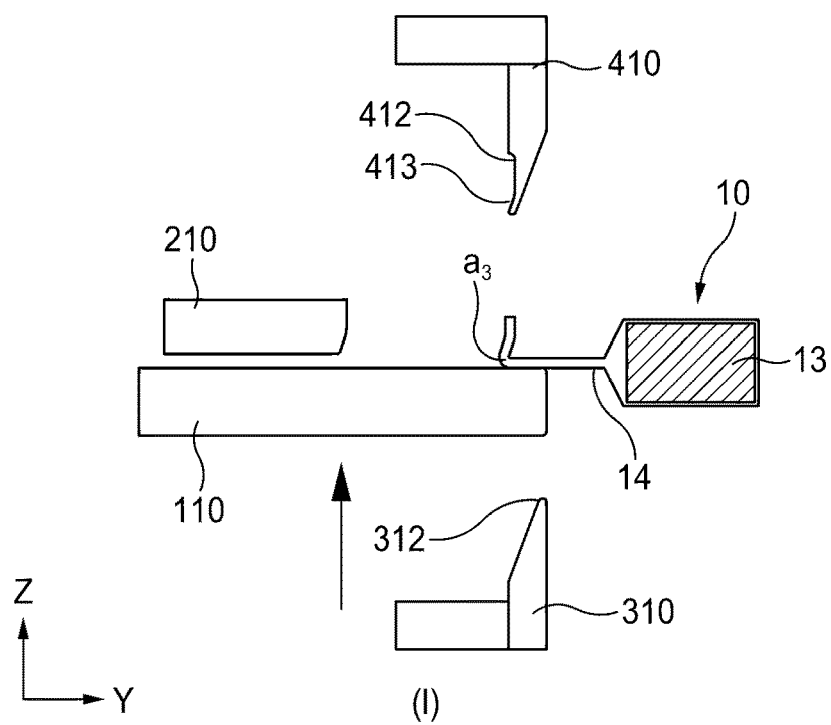
(l)

[FIG. 16]
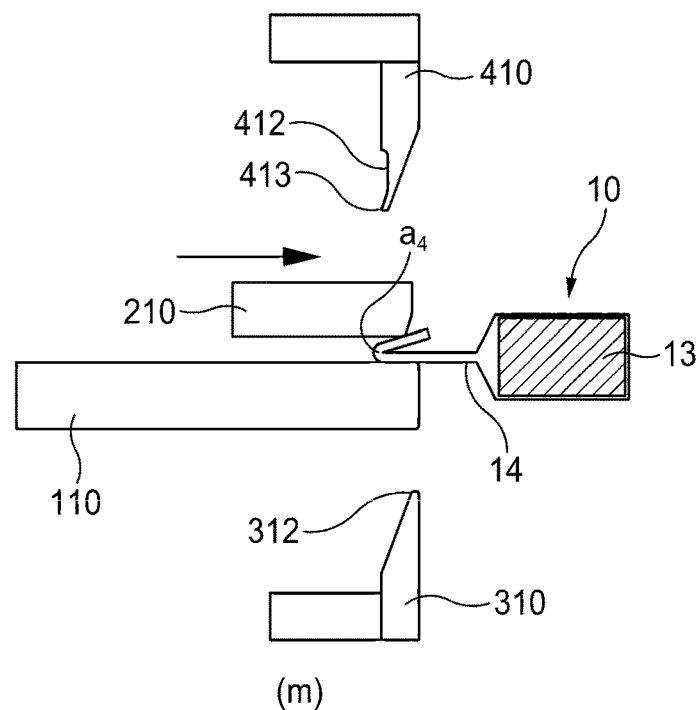
(m)
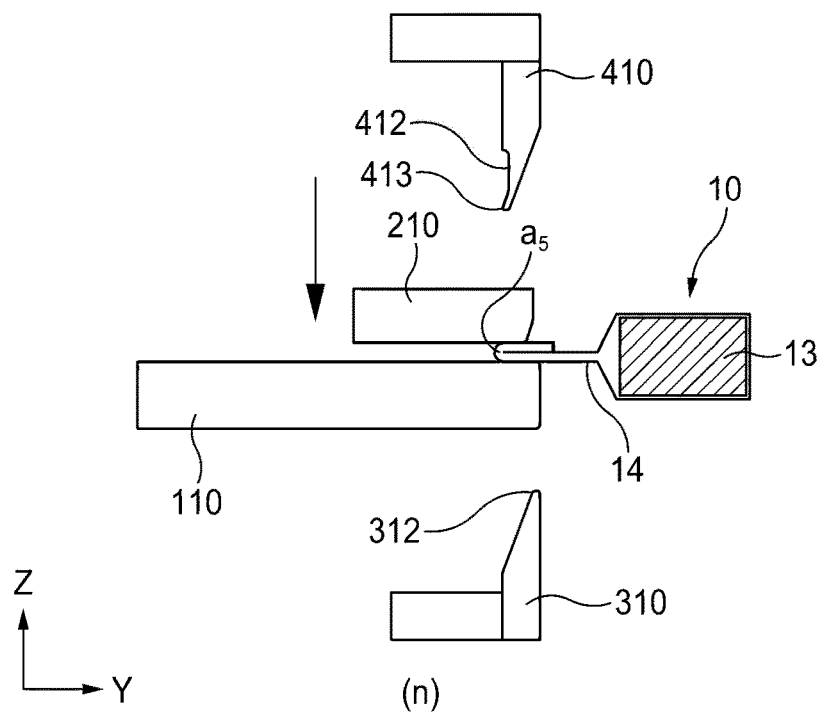
(n)

SEALED PORTION FOLDING APPARATUS AND METHOD FOR POUCH-SHAPED BATTERY CELLS

CROSS-REFERENCE TO RELATED APPLICATIONS

This application is a national phase entry under 35 U.S.C. § 371 of International Application No. PCT/KR2023/012836 filed Aug. 30, 2023, which claims priority from Korean Patent Application No. 2022-0119747 filed on Sep. 22, 2022, and Korean Patent Application No. 2023-0097591 filed on Jul. 26, 2023, each the disclosures of which are incorporated herein by reference.

FIELD OF THE INVENTION

The present invention relates to a sealed portion folding apparatus and method for pouch-shaped battery cells, and more particularly to a sealed portion folding apparatus and method for pouch-shaped battery cells capable of folding a sealed portion at various angles and performing an accurate folding process at a fixed position regardless of the width of a battery cell.

BACKGROUND OF THE INVENTION

With recent development of alternative energy due to air pollution and energy depletion caused as the result of use of fossil fuels, demand for secondary batteries capable of storing electrical energy that is produced has increased. Secondary batteries, which are capable of being charged and discharged, are widely used in various fields, such as mobile devices, electric vehicles, hybrid electric vehicles, and industrial robots.

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other or a battery pack including a plurality of battery modules is used in a vehicle.

For a pouch-shaped battery cell, which is one of the secondary batteries, an electrode assembly is received in a case having a pocket formed therein, and a wing portion, which is an edge of the case, is sealed. Subsequently, an activation process, a degassing process, a resealing process, and a process of folding the sealed wing portion are sequentially performed.

Meanwhile, the length of the pouch-shaped battery cell is increasing due to diversification of devices to which secondary batteries are applied and increasing demand for secondary batteries having high energy density. Since a middle part of the wing portion is more flexible than an edge of the wing portion, however, the case in which the wing portion is folded outside a predetermined folding line occurs, which inevitably leads to product defects.

In connection therewith, a prior art document (Korean Registered Patent Publication No. 1974443) discloses an automatic terrace folding apparatus for secondary battery cells capable of sequentially folding a terrace of a secondary battery to 90°, 180°, and 270° in three stages while automatically transferring the secondary battery in the state in which the secondary battery is seated in a carrier, wherein the terrace is folded first to 90° using a folding blade, the terrace in a vertically folded state is pushed by a roller such that the terrace is folded to 180°, and the terrace folded to 180° is pushed from bottom to top such that the terrace is folded to 270°.

In the prior art document, the terrace of the secondary battery is folded by 90° so as to be folded to 180° or 270°. To this end, however, a plurality of folding apparatuses is necessary, resulting in low process efficiency and high equipment purchase cost.

BRIEF SUMMARY OF THE INVENTION

The present invention has been made in view of the above problems, and it is an object of the present invention to provide a sealed portion folding apparatus and method for pouch-shaped battery cells capable of folding a sealed portion of a secondary battery to 90°, 180°, 270°, and 360° using one folding apparatus.

It is another object of the present invention to provide a sealed portion folding apparatus and method for pouch-shaped battery cells capable of performing folding at a fixed position regardless of the length of a battery cell.

A sealed portion folding apparatus for pouch-shaped battery cells according to the present invention to accomplish the above objects is an apparatus for folding a sealed portion of a pouch-shaped battery cell configured such that an electrode assembly is received in a cell case (11), electrode leads (12) protrude from one side or opposite sides of the cell case (11), and a sealed portion (14) is provided at three sides or four sides of an edge of the cell case, the apparatus including a lower unit (100) configured to allow the sealed portion (14) to be seated thereon, the lower unit comprising a lower folding block (110) configured to perform horizontal reciprocation and upward and downward movement, an upper unit (200) located above the lower unit (100), the upper unit comprising an upper folding block (210) configured to perform horizontal reciprocation and upward and downward movement and to press the sealed portion (14) so as to be bent to a predetermined angle, a lower folding guide unit (300) located in front of the lower unit (100), the lower folding guide unit being configured to perform upward and downward movement and to guide the sealed portion (14) so as to be bent to a predetermined angle, and an upper folding guide unit (400) located in front of the upper unit (200), the upper folding guide unit being configured to perform upward and downward movement and to guide the sealed portion (14) so as to be bent to a predetermined angle.

Also, in the sealed portion folding apparatus for pouch-shaped battery cells according to the present invention, the upper folding block (210) may have a length equal to or greater than a length of the sealed portion (14), and a front surface of the upper folding block that faces the sealed portion (14) may be configured such that a vertical surface (210(a)) and a first inclined surface (210(b)) inclined as a result of cutting in a downward direction are sequentially disposed from above.

Also, in the sealed portion folding apparatus for pouch-shaped battery cells according to the present invention, the upper folding block (210) may be constituted by a first upper folding block (211), a second upper folding block (212), and a third upper folding block (213) sequentially disposed side by side in a longitudinal direction of the sealed portion (14).

Also, in the sealed portion folding apparatus for pouch-shaped battery cells according to the present invention, the second upper folding block (212) may be disposed so as to protrude farther than the first upper folding block (211) and the third upper folding block (213) in a forward direction.

Also, in the sealed portion folding apparatus for pouch-shaped battery cells according to the present invention, the first upper folding block (211), the second upper folding block (212), and the third upper folding block (213) may be independently operable.

Also, in the sealed portion folding apparatus for pouch-shaped battery cells according to the present invention, the upper folding block (210) may be configured such that a middle part of the upper folding block protrudes farther than an edge part of the upper folding block in a forward direction.

Also, in the sealed portion folding apparatus for pouch-shaped battery cells according to the present invention, the upper folding block (210) may be configured such that the edge part of the upper folding block protrudes farther than the middle part of the upper folding block in the forward direction.

Also, in the sealed portion folding apparatus for pouch-shaped battery cells according to the present invention, at least one of the lower folding block (110) and the upper folding block (210) may be provided with a heating means configured to increase the temperature of the sealed portion to a predetermined temperature.

Also, in the sealed portion folding apparatus for pouch-shaped battery cells according to the present invention, the lower folding guide unit (300) may include a lower blade (310), wherein the lower blade (310) may have a length equal to or greater than the length of the sealed portion (14), and an inner surface of the lower blade that faces the lower unit (100) may be provided with a second inclined surface (311) inclined at a predetermined angle so as to have a thickness gradually decreasing in an upward direction.

Also, in the sealed portion folding apparatus for pouch-shaped battery cells according to the present invention, the upper folding guide unit (400) may include an upper blade (410), wherein the upper blade (410) may have a length equal to or greater than the length of the sealed portion (14), and an outer surface of the upper blade may be provided with a third inclined surface (411) inclined at a predetermined angle as a result of cutting in the downward direction.

Also, in the sealed portion folding apparatus for pouch-shaped battery cells according to the present invention, the upper blade (410) may be provided in an inner surface thereof with a depressed portion (412) configured to receive the vertical surface (210(a)) and a part of the first inclined surface (210(b)) upon approach of the upper folding block (210).

Also, in the sealed portion folding apparatus for pouch-shaped battery cells according to the present invention, the lower blade (310) and the upper blade (410) may move upward and downward in the state in which the center axis of the lower blade and the center axis of the upper blade move are located on the same vertical line.

In addition, a sealed portion folding method for pouch-shaped battery cells according to the present invention is a method of folding a sealed portion of a pouch-shaped battery cell configured such that an electrode assembly is received in a cell case (11), electrode leads (12) protrude from one side or opposite sides of the cell case (11), and a sealed portion (14) is provided at three sides or four sides of an edge of the cell case, the method including a first step of locating the sealed portion (14) on a lower folding block (110), a second step of moving a lower blade (310) upward so as to come into tight contact with a lower surface of the sealed portion (14), a third step of downwardly moving an upper blade (410) to a space between the lower folding block (110) and the lower blade (310) to bend the sealed portion (14) by a first angle (a1), a fourth step of moving the lower folding block (110) upward to bend the sealed portion bent to the first angle (a1) by a second angle (a2), a fifth step of moving the lower folding block (110) downward, a sixth step of moving the upper folding block (210) downward, a seventh step of moving the upper folding block (210) forward to bend the sealed portion bent to the second angle (a2) by a third angle (a3), an eighth step of moving the upper folding block (210) backward, a ninth step of moving the lower blade (310) downward and moving the upper blade (410) upward, a tenth step of moving the upper folding block (210) upward, an eleventh step of moving the lower folding block (110) forward, a twelfth step of moving the lower folding block (110) upward, and a thirteenth step of moving the upper folding block (210) forward to bend the sealed portion bent to the third angle (a3) by a fourth angle (a4).

Also, the sealed portion folding method for pouch-shaped battery cells according to the present invention may further include a fourteenth step of moving the upper folding block (210) downward to bend the sealed portion by a fifth angle (a5).

Also, in the sealed portion folding method for pouch-shaped battery cells according to the present invention, each of the first angle (a1) and the second angle (a2) may be an obtuse angle, and each of the third angle (a3) and the fourth angle (a4) may be an acute angle.

Also, in the sealed portion folding method for pouch-shaped battery cells according to the present invention, the fifth angle (a5) may be 0°.

Also, in the sealed portion folding method for pouch-shaped battery cells according to the present invention, the upper folding block (210) may be constituted by a first upper folding block (211), a second upper folding block (212), and a third upper folding block (213) sequentially disposed side by side in a longitudinal direction of the sealed portion (14), and the second upper folding block (212) may protrude farther than the first upper folding block (211) and the third upper folding block (213) in a forward direction, such that a middle part of the sealed portion (14) is bent before opposite side parts of the sealed portion are bent in the seventh step.

As is apparent from the above description, a sealed portion folding apparatus and method for pouch-shaped battery cells according to the present invention have a merit in that an upper folding block, a lower folding block, a lower blade, and an upper blade, which support, press, or guide a sealed portion of a secondary battery, can move in a vertical direction as well as a horizontal direction, whereby it is possible to fold the sealed portion of the secondary battery to various angles.

In addition, the sealed portion folding apparatus and method for pouch-shaped battery cells according to the present invention have an advantage in that the upper folding block is constituted by a plurality of unit folding blocks that are independently movable, whereby it is possible to perform folding at a fixed position regardless of the length of a battery cell.

BRIEF DESCRIPTION OF THE DRAWINGS

FIG. 1 is a perspective view of a pouch-shaped battery cell according to the present invention.

FIG. 2 is a side view showing a sealed portion folding apparatus for pouch-shaped battery cells according to a first preferred embodiment of the present invention.

FIG. 3 is a perspective view of an upper folding unit constituting the sealed portion folding apparatus shown in FIG. 2.

FIG. 4 is a plan view of the upper folding unit shown in FIG. 3.

FIG. 5 is a perspective view of an upper folding unit constituting a sealed portion folding apparatus for pouch-shaped battery cells according to a second preferred embodiment of the present invention.

FIG. 6 is a plan view of the upper folding unit shown in FIG. 5.

FIG. 7 is a perspective view of an upper folding unit constituting a sealed portion folding apparatus for pouch-shaped battery cells according to a third preferred embodiment of the present invention.

FIG. 8 is a plan view of the upper folding unit shown in FIG. 7.

FIG. 9 is a flowchart illustrating a folding method using the sealed portion folding apparatus for pouch-shaped battery cells according to the first preferred embodiment of the present invention.

FIG. 10 is a view illustrating the operation of the folding apparatus in a first step and a second step of the sealed portion folding method for pouch-shaped battery cells according to the present invention.

FIG. 11 is a view illustrating the operation of the folding apparatus in a third step and a fourth step of the sealed portion folding method for pouch-shaped battery cells according to the present invention.

FIG. 12 is a view illustrating the operation of the folding apparatus in a fifth step and a sixth step of the sealed portion folding method for pouch-shaped battery cells according to the present invention.

FIG. 13 is a view illustrating the operation of the folding apparatus in a seventh step and an eighth step of the sealed portion folding method for pouch-shaped battery cells according to the present invention.

FIG. 14 is a view illustrating the operation of the folding apparatus in a ninth step and a tenth step of the sealed portion folding method for pouch-shaped battery cells according to the present invention.

FIG. 15 is a view illustrating the operation of the folding apparatus in an eleventh step and a twelfth step of the sealed portion folding method for pouch-shaped battery cells according to the present invention.

FIG. 16 is a view illustrating the operation of the folding apparatus in a thirteenth step and a fourteenth step of the sealed portion folding method for pouch-shaped battery cells according to the present invention.

DETAILED DESCRIPTION

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is the to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a sealed portion folding apparatus and method for pouch-shaped battery cells according to the present invention will be described with reference to the accompanying drawings.

FIG. 1 is a perspective view of a pouch-shaped battery cell according to the present invention. As shown in FIG. 1, the pouch-shaped battery cell 10, to which a folding apparatus and method according to the present invention are applied, has an electrode assembly received in a case 11 constituted by an upper case 11(a) and a lower case 11(b). In addition, electrode leads 12 connected to electrode tabs of the electrode assembly protrude from opposite sides of the case 11, and three sides of an edge of the case 11 are sealed.

Here, a part of a three-sided sealed portion 14, from which no electrode lead 12 protrudes, i.e., a sealed portion 14 called a wing portion, is folded, and the sealed portion 14 is folded along a folding line 14'.

Although the three-sided sealed portion is shown in the figure, a fourth-sided sealed portion may be provided when the upper case and lower case constituting the case are not connected to each other, and it is obvious that a unidirectional battery cell having electrode leads exposed in the same direction may be folded using the folding apparatus according to the present invention.

Meanwhile, a pocket portion is formed in the cell case 11 by punching a laminate sheet including an outer resin layer, a metal layer, and an inner resin layer.

The outer resin layer is located at an outer side of the cell case 11, and the outer resin layer may be made of a heat-resistant polymer that exhibits excellent tensile strength, resistance to moisture permeation, and resistance to air transmission in order to secure heat resistance and chemical resistance while protecting the electrode assembly received in the cell case. As an example, the outer resin layer may be made of nylon or polyethylene terephthalate; however, the present invention is not limited thereto.

The metal layer, which abuts the outer resin layer, corresponds to a barrier layer configured to prevent moisture or various kinds of gas from permeating into the battery from the outside. An aluminum thin film, which is lightweight and easily shapeable, may be used as a preferred material for the metal layer.

The inner resin layer is disposed in direct contact with the electrode assembly, and therefore the inner resin layer must exhibit high insulation properties and high electrolytic resistance. In addition, the inner resin layer must exhibit high sealability in order to hermetically isolate the cell case from the outside, i.e., a thermally-bonded sealed portion between inner layers must exhibit excellent thermal bonding strength. The inner resin layer may be made of a material selected from among a polyolefin-based resin, such as polypropylene, polyethylene, polyethylene acrylic acid, or polybutylene, a polyurethane resin, and a polyimide resin, which exhibit excellent chemical resistance and high sealability; however, the present invention is not limited thereto, and polypropylene, which exhibits excellent mechanical properties, such as tensile strength, rigidity, surface hardness, and impact resistance, and excellent chemical resistance, is the most preferably used.

The electrode assembly may be a jelly-roll type electrode assembly, which is configured to have a structure in which a long sheet type negative electrode and a long sheet type positive electrode are wound in the state in which a separator is interposed therebetween, a stacked type electrode assembly including unit cells, each of which is configured to have a structure in which a rectangular positive electrode and a rectangular negative electrode are stacked in the state in which a separator is interposed therebetween, a stacked and folded type electrode assembly, which is configured to have a structure in which unit cells are wound using a long separation film, or a laminated and stacked type electrode assembly, which is configured to have a structure in which unit cells are stacked in the state in which a separator is interposed therebetween and are then attached to each other; however, the present invention is not limited thereto.

Meanwhile, in the specification of the present invention, an overall length direction of the battery cell corresponds to an X-axis direction, an overall width direction of the battery cell corresponds to a Y-axis direction, and a height direction of the battery cell corresponds to a Z-axis direction (see FIG. 1).

FIG. 2 is a side view showing a sealed portion folding apparatus for pouch-shaped battery cells according to a first preferred embodiment of the present invention, FIG. 3 is a perspective view of an upper folding unit constituting the sealed portion folding apparatus shown in FIG. 2, and FIG. 4 is a plan view of the upper folding unit shown in FIG. 3.

The sealed portion folding apparatus for pouch-shaped battery cells according to the present invention includes a lower unit 100, an upper unit 200, a lower folding guide unit 300, and an upper folding guide unit 400.

First, the lower unit 100, on which a sealed portion 14 of a battery cell is seated, may move upward and downward in the height direction (Z-axis direction) of the battery cell while horizontally reciprocating so as to move forward or backward in the overall width direction (Y-axis direction) of the battery cell.

Specifically, the lower unit 100 may include a lower folding block 110, a first drive shaft 120, and a second drive shaft 130.

The lower folding block 110, which has an approximately hexahedral shape with a flat upper surface, is located below the sealed portion to support the sealed portion or to help the sealed portion to be bent to a predetermined angle. Here, it is preferable for the length of the lower folding block 110 to be equal to or greater than the length of the sealed portion to be bent so as to come into contact with all parts of the sealed portion.

The first drive shaft 120 is connected to the lower folding block 110 and may move forward or backward in the overall width direction (Y-axis direction) of the cell, and the second drive shaft 130, which is connected to the first drive shaft 120, may move upward and downward in the height direction (Z-axis direction) of the battery cell.

Although not shown in the figures, a known drive means configured to enable linear motion, such as a servomotor or a cylinder, is connected to each of the first drive shaft 120 and the second drive shaft 130. However, the present invention is not necessarily limited to the above configuration as long as the lower folding block 110 can move upward and downward while reciprocating horizontally.

The upper unit 200 is located above the lower unit 100 and is configured to press the sealed portion so as to be bent to a predetermined angle while horizontally reciprocating so as to move forward or backward in the overall width direction (Y-axis direction) of the battery cell and moving upward and downward in the height direction (Z-axis direction) of the battery cell.

Specifically, the upper unit 200 may include an upper folding block 210, a third drive shaft 220, and a fourth drive shaft 230.

The upper folding block 210 is located above the lower folding block 110 to push or press the sealed portion so as to be bent to a predetermined angle, and it is preferable for the length of the upper folding block to be equal to or greater than the length of the sealed portion to be bent so as to come into contact with all parts of the sealed portion.

The upper folding block 210 may have an approximately hexahedral shape with a flat lower surface, and it is preferable for a part of a front surface of the upper folding block, which faces forward, to be slightly inclined. Specifically, it is preferable for a vertical surface 210(a) perpendicular to the upper surface of the lower folding block 110 to be located at an upper part of the front surface, whereas it is preferable for a first inclined surface 210(b) inclined as the result of being cut downward to be located below the vertical surface 210(a).

When the sealed portion is folded using the apparatus according to the present invention, the sealed portion is folded 180° after a plurality of bending processes. Since the first inclined surface 210(b) is provided at the upper folding block 210, 180° folding is easily achieved, which will be described in detail later.

The third drive shaft 220 is connected to the upper folding block 210 and may move forward or backward in the overall width direction (Y-axis direction) of the cell, and the fourth drive shaft 230, which is connected to the third drive shaft 220, may move upward and downward in the height direction (Z-axis direction) of the battery cell.

Although not shown in the figures, a known drive means configured to enable linear motion, such as a servomotor or a cylinder, is connected to each of the third drive shaft 220 and the fourth drive shaft 230. However, the present invention is not necessarily limited to the above configuration as long as the upper folding block 210 can move upward and downward while reciprocating horizontally.

Meanwhile, the upper folding block 210 may be constituted by a plurality of independently operable unit folding blocks, and may be configured such that a middle part of the upper folding block protrudes farther than opposite side edges thereof.

Specifically, as shown in FIGS. 3 and 4, a first upper folding block 211, a second upper folding block 212, and a third upper folding block 213 may be sequentially disposed in the overall length direction (X-axis direction) of the battery cell to constitute one upper folding block 210.

At this time, the second upper folding block 212, which is located in the middle, protrudes slightly farther than the first upper folding block 211 and the third upper folding block 213, which are located at opposite sides, in a forward direction. Of course, a front surface of each of the first upper folding block 211 to the third upper folding block 213 is also provided with a vertical surface and a first inclined surface.

As previously described, when the sealed portion in the overall length direction of the battery cell is folded, a folding defect in which the sealed portion is bent in front of a predetermined folding line occurs, since a middle part of the sealed portion is more flexible than opposite side edges of the sealed portion.

Since the upper folding block 210 of the present invention is configured to have a structure in which the second upper folding block 212 that faces the middle part of the sealed portion, which corresponds to a flexible sealed region, protrudes slightly farther than the other upper folding blocks, however, it is possible to reduce such a folding defect.

Furthermore, the first upper folding block 211, the second upper folding block 212, and the third upper folding block 213 for horizontal movement in the overall width direction (Y-axis direction) of the battery cell are provided respectively with a third (a) drive shaft 221, a third (b) drive shaft 222, and a third (c) drive shaft 223, and a fourth (a) drive shaft 231, a fourth (b) drive shaft 232, and a fourth (c) drive shaft 233 for upward and downward movement are connected respectively to the first upper folding block, the second upper folding block, and the third upper folding block. Consequently, it is possible to individually adjust the protruding lengths of the first upper folding block 211, the second upper folding block 212, and the third upper folding block 213 in consideration of the overall length of the battery cell.

The lower folding guide unit 300 will be described with reference back to FIG. 2.

The lower folding guide unit 300, which is configured to guide the sealed portion so as to be bent to a predetermined angle, is located in front of the lower unit 100, and is capable of moving upward and downward in the height direction (Z-axis direction) of the battery cell and horizontally reciprocating so as to move forward or backward in the overall width direction (Y-axis direction) of the battery cell.

Specifically, the lower folding guide unit 300 may include a lower blade 310, a first support portion 320, a fifth drive shaft 330, and a sixth drive shaft 340.

First, the lower blade 310 performs the function of supporting a lower surface of the sealed portion such that the sealed portion can be bent to a predetermined angle, and therefore it is preferable for the lower blade to have a length equal to or greater than the length of the sealed portion. An inner surface of the lower blade 310 that faces the lower unit 100 is inclined, specifically the lower blade 310 is provided with a second inclined surface 311 inclined at a predetermined angle such that the thickness thereof gradually decreases in a direction in which the upper folding guide unit 400 is located, and a first nip 312 is provided at the end of the second inclined surface.

This serves to ensure that there is space between the upper blade 410 and the lower blade 310 when the upper blade 410, which will be described later, moves downward, whereby the sealed portion can be bent to a predetermined angle.

The first support portion 320 is configured to support the lower blade 310, the fifth drive shaft 330 is connected to the first support portion 320 and is movable forward or backward in the overall width direction (Y-axis direction) of the battery cell, and the sixth drive shaft 340, which is connected to the fifth drive shaft 330, is movable upward and downward in the height direction (Z-axis direction) of the battery cell.

Although not shown in the figures, a known drive means configured to enable linear motion, such as a servomotor or a cylinder, is connected to each of the fifth drive shaft 330 and the sixth drive shaft 340. However, the present invention is not necessarily limited to the above configuration as long as the lower blade 310 can move upward and downward while reciprocating horizontally.

Furthermore, although the fifth drive shaft 330 is described as being connected to the first support portion 320, the fifth drive shaft may be directly connected to the lower blade 310 without the first support portion 320.

Meanwhile, at least one of the lower folding block 110 and the upper folding block 210 may be provided with a heating member (not shown) such that the sealed portion can be maintained in a bent state. For example, the heating member (not shown) may be received in each of the lower folding block 110 and the upper folding block 210 or attached to an outer surface of one side thereof such that the temperature of the sealed portion rises during a process of bending the sealed portion. In particular, when heating is performed to a temperature equal to or higher than the melting point of the inner resin layer of the cell case, insulation resistance may be improved.

Next, the upper folding guide unit 400 is configured to guide the sealed portion so as to be bent to a predetermined angle. The upper folding guide unit is located in front of the upper unit 200, and is capable of moving upward and downward in the height direction (Z-axis direction) of the battery cell and horizontally reciprocating so as to move forward or backward in the overall width direction (Y-axis direction) of the battery cell.

Specifically, the upper folding guide unit 400 may include an upper blade 410, a second support portion 420, a seventh drive shaft 430, and an eighth drive shaft 440.

First, the upper blade 410 performs the function of pressing an upper surface of the sealed portion such that the sealed portion can be bent to a predetermined angle, and therefore it is preferable for the upper blade to have a length equal to or greater than the length of the sealed portion. In addition, a third inclined surface 411 is formed on an outer surface of the upper blade, and a depressed portion 412 is provided in an inner surface of the upper blade.

Here, it is preferable for the third inclined surface 411 to be inclined at a predetermined angle so as to have a thickness gradually decreasing in a downward direction, and it is more preferable for the third inclined surface to have the same angle as the inclined surface of the lower blade 310 except that the inclined surfaces are different in only position from each other.

This is to ensure that the center axis of the lower blade 310 and the center axis of the upper blade 410 do not collide with each other in some sections even though the lower blade and the upper blade move upward and downward relative to each other on the same vertical line.

The depressed portion 412, which provided in the surface opposite the third inclined surface 411, i.e., the surface that faces the upper folding block 210, is configured to allow the sealed portion to be bent to an acute angle.

Specifically, when the upper folding block 210 moves inwardly of the upper blade 410 in order to press the sealed portion in a state of being bent to a predetermined angle, the vertical surface 210(*a*) and the first inclined surface 210(*b*) of the upper folding block 210 and a part of the sealed portion may be received in the depressed portion. Reference numeral 413 indicates a second nip.

The second support portion 420 is configured to support the upper blade 410, the seventh drive shaft 430 is connected to the second support portion 420 and is movable forward or backward in the overall width direction (Y-axis direction) of the battery cell, and the eighth drive shaft 440, which is connected to the seventh drive shaft 430, is movable upward and downward in the height direction (Z-axis direction) of the battery cell.

Although not shown in the figures, a known drive means configured to enable linear motion, such as a servomotor or a cylinder, is connected to each of the seventh drive shaft 430 and the eighth drive shaft 440. However, the present invention is not necessarily limited to the above configuration as long as the upper blade 410 can move upward and downward while reciprocating horizontally.

Furthermore, although the seventh drive shaft 430 is described as being connected to the second support portion 420, the seventh drive shaft may be directly connected to the upper blade 410 without the second support portion 420.

Meanwhile, it is preferable for the part of each of the lower folding block 110, the upper folding block 210, the lower blade 310, and the upper blade 410 that is in contact with the sealed portion to be rounded with a predetermined radius of curvature such that the sealed portion is not damaged.

FIG. 5 is a perspective view of an upper folding unit constituting a sealed portion folding apparatus for pouch-shaped battery cells according to a second preferred embodiment of the present invention, and FIG. 6 is a plan view of the upper folding unit shown in FIG. 5.

Except for the upper folding unit, the second embodiment is identical in configuration to the first embodiment. The upper folding block according to the first embodiment of the invention is constituted by a plurality of units, whereas the upper folding block 210 according to the second embodiment is constituted by one integrated member having a middle part protruding farther than edge parts in the forward direction.

FIG. 7 is a perspective view of an upper folding unit constituting a sealed portion folding apparatus for pouch-shaped battery cells according to a third preferred embodiment of the present invention, and FIG. 8 is a plan view of the upper folding unit shown in FIG. 7.

Except for the upper folding unit, the third embodiment is identical in configuration to the first embodiment. The upper folding block according to the first embodiment of the invention is constituted by a plurality of units, whereas the upper folding block 210 according to the third embodiment is constituted by one integrated member having opposite edge parts protruding farther than a middle part in the forward direction. The upper folding block 210 according to the third embodiment may be used when it is necessary to bend the edge parts of the sealed portion before the middle part of the sealed portion is bent.

Next, a method of folding a sealed portion of a pouch-shaped battery cell using the folding apparatus described above will be described.

FIG. 9 is a flowchart illustrating a folding method using the sealed portion folding apparatus for pouch-shaped battery cells according to the first preferred embodiment of the present invention. FIG. 10 is a view illustrating the operation of the folding apparatus in a first step and a second step of the sealed portion folding method for pouch-shaped battery cells according to the present invention, FIG. 11 is a view illustrating the operation of the folding apparatus in a third step and a fourth step of the sealed portion folding method for pouch-shaped battery cells according to the present invention, and FIG. 12 is a view illustrating the operation of the folding apparatus in a fifth step and a sixth step of the sealed portion folding method for pouch-shaped battery cells according to the present invention.

In addition, FIG. 13 is a view illustrating the operation of the folding apparatus in a seventh step and an eighth step of the sealed portion folding method for pouch-shaped battery cells according to the present invention, FIG. 14 is a view illustrating the operation of the folding apparatus in a ninth step and a tenth step of the sealed portion folding method for pouch-shaped battery cells according to the present invention, FIG. 15 is a view illustrating the operation of the folding apparatus in an eleventh step and a twelfth step of the sealed portion folding method for pouch-shaped battery cells according to the present invention, and FIG. 16 is a view illustrating the operation of the folding apparatus in a thirteenth step and a fourteenth step of the sealed portion folding method for pouch-shaped battery cells according to the present invention.

Referring to FIGS. 9 to 16, in the sealed portion folding method for pouch-shaped battery cells according to the present invention, the first step of locating a sealed portion 14 on the lower folding block 110 of the lower unit 100 is performed (see (a) of FIG. 10).

At this time, the lower blade 310 and the upper blade 410 are spaced apart respectively from lower and upper sides of the sealed portion 14 by a predetermined distance while being located on the same vertical axis line, and the sealed portion 14 and the upper surface of the lower folding block 110 are slightly spaced apart from each other such that the sealed portion is easily bent.

A folding line 14' of the sealed portion 14 is located on the same vertical line as the second nip 413, which is the end of the upper blade 410.

Meanwhile, as in FIG. 1, an electrode assembly is received in a cell case 11, electrode leads protrude from opposite sides of the cell case 11, and the sealed portion 14 is provided at three sides of an edge of the cell case. Of course, the battery cell may be a unidirectional battery cell having electrode leads 12 protruding from one side thereof or a battery cell having a sealed portion provided at all four sides of an edge thereof.

In the second step, the lower blade 310 of the lower folding guide unit 300, which is located in front of the lower unit 100, is moved upward such that the first nip 312 comes into tight contact with a lower surface of the sealed portion 14 (see (b) of FIG. 10).

Here, the first nip 312 and the sealed portion 14 come into tight contact with each other in front of a fold line 14'.

In the third step, the upper blade 410 of the upper folding guide unit 400 is moved downward to bend the sealed portion 14 by a first angle a1. Specifically, the upper blade 410 is moved downward toward the fold line 14' located between one end of the lower folding block 110 and the lower blade 310 to obtain the sealed portion 14 in a state of being bent by the first angle a1 and a first' angle a1' (see (c) of FIG. 11).

Here, the first angle a1 is the angle of the folding line 14', specifically an angle formed by the sealed portion between the first nip 312 of the lower blade 310 and the second nip 413 of the upper blade 410 and the sealed portion extending from the second nip 413 to the end of the sealed portion, which is an obtuse angle.

The first' angle a1' is the angle formed by the sealed portion located in front of the first nip 312 and the sealed portion located between the first nip 312 and the second nip 413, which is also an obtuse angle.

The fourth step is a step of moving the lower folding block 110 upward to bend the sealed portion bent to the first angle a1 by a second angle a2 (see (d) of FIG. 11). That is, when the lower folding block 110 is moved upward, the upper edge of one end of the lower folding block 110 pushes the sealed portion 14 upward, whereby the sealed portion is bent to the second angle a2, which is smaller than the first angle a1 obtained in the third step.

In the fifth step, the lower folding block 110, which was moved upward in the fifth step is moved downward so as to return to the original position thereof (see (e) of FIG. 12).

The sixth step is a step of moving the upper folding block 210 downward (see (f) of FIG. 12). Specifically, the upper folding block 210 of the upper unit 200, which is located at the rear of the upper folding guide unit 400, is moved downward. At this time, it is preferable for the lower surface of the upper folding block 210 and the upper surface of the lower folding block 110 to be located very close to each other so as not to come into contact with each other.

The seventh step is a step of moving the upper folding block 210 forward to bend the sealed portion bent to the second angle a2 by a third angle a3 (see (g) of FIG. 13). That is, the upper folding block 210 is moved forward in a direction toward the upper blade 410 until the sealed portion 14 located at one side of the second nip 413 of the upper blade 410 comes into tight contact with the depressed portion 412 of the upper blade 410, whereby the sealed portion is bent to the third angle a3, which is smaller than the second angle a2.

In particular, when the second upper folding block 212, which is located in the middle, is moved forward in the state in which the second upper folding block 212 protrudes slightly farther than the first upper folding block 211 and the third upper folding block 213, which are located at opposite sides, using the upper folding block 210, in which the first upper folding block 211, the second upper folding block 212, and the third upper folding block 213 are sequentially disposed, as shown in FIGS. 3 and 4, it is possible to minimize a folding defect occurring at the middle part of the sealed portion 14.

Meanwhile, the vertical surface 210(a) and the first inclined surface 210(b) of the upper folding block 210 are located in the depressed portion 412 of the upper blade 410, and the third angle a3 is an acute angle.

The eighth step is a step of moving the upper folding block 210 backward so as to return to the position thereof in the sixth step (see (h) of FIG. 13).

The ninth step is a step of moving the lower blade 310 downward and moving the upper blade 410 upward (see (i) of FIG. 10), and the tenth step is a step of moving the upper folding block 210 upward (see (j) of FIG. 14).

Meanwhile, in the tenth step, it is preferable for the upper surface of the unbent sealed portion 14, e.g., the sealed portion 14 located between the portion bent to the first' angle of a' and a pocket portion of a cell case 11, and the lower surface of the upper folding block 210 to be spaced apart from each other by a distance greater than two times the thickness of the sealed portion 14 such that the sealed portion 14 can be easily bent in a subsequent step.

The eleventh step is a step of moving the lower folding block 110 forward by a predetermined distance (see (k) of FIG. 15), and, in the twelfth step, the lower folding block 110 is moved upward such that the sealed portion 14 located at the front and the sealed portion 14 located at the rear based on the first' angle a1' are parallel to each other (see (1) of FIG. 15).

Although the state in which the first' angle of a' has been eliminated, i.e., the sealed portion has been completely unfolded, is shown in FIG. 12, which shows the twelfth step, the sealed portion may be maintained at an obtuse angle greater than the first' angle of a'.

The thirteenth step is a step of bending the sealed portion bent to the third angle a3 by a fourth angle a4 (see (m) of FIG. 16). The upper folding block 210 is moved forward to bend the sealed portion 14 bent to the third angle a3 by the fourth angle a4 such that the sealed portion 14 can be completely bent based on the folding line 14'. Here, the fourth angle a4 is an acute angle less than the third angle a3, and may be close to approximately 0°.

The fourteenth step, which is the last step, is a step of bending the sealed portion by a fifth angle a5 corresponding to 0°. The upper folding block 210 is moved downward to such an extent that there is no gap between the lower folding block 110, the sealed portion 14, and the upper folding block 210, whereby the sealed portion 14 is completely folded with the folding line 14' as the boundary (see (n) of FIG. 16).

When the first to fourteenth steps are performed, the sealed portion 14 is folded 180° with the folding line 14' as the boundary.

Subsequently, the upper folding block 210 is moved upward or the lower folding block 110 is moved downward, and the battery cell 10 is separated from the folding apparatus.

When it is necessary to fold the sealed portion 14 once again, the first to fourteenth steps may be repeated, whereby it is possible to obtain the battery cell 10 in a twice-folded state.

Meanwhile, the lower folding block 110 and the upper folding block 210 may be heated to a predetermined temperature while the first to fourteenth steps are performed, or the lower folding block and the upper folding block may be heated only in the thirteenth step and the fourteenth step.

Those skilled in the art to which the present invention pertains will appreciate that various applications and modifications are possible within the category of the present invention based on the above description.

DESCRIPTION OF REFERENCE SYMBOLS

10: Pouch-shaped battery cell
11: Cell case
11(a): Upper case 11(b): Lower case
12: Electrode lead
14: Sealed portion 14': Folding line
100: Lower unit
110: Lower folding block
120: First drive shaft
130: Second drive shaft
200: Upper unit
210: Upper folding block
210(a): Vertical surface 210(b): First inclined surface
211: First upper folding block 212: Second upper folding block
213: Third upper folding block
220: Third drive shaft
221: Third (a) drive shaft 222: Third (b) drive shaft
223: Third (c) drive shaft
230: Fourth drive shaft
231: Fourth (a) drive shaft 232: Fourth (b) drive shaft
233: Fourth (c) drive shaft
300: Lower folding guide unit
310: Lower blade
311: Second inclined surface 312: First nip
320: First support portion
330: Fifth drive shaft
340: Sixth drive shaft
400: Upper folding guide unit
410: Upper blade
411: Third inclined surface 412: Depressed portion
413: Second nip
420: Second support portion
430: Seventh drive shaft
440: Eighth drive shaft
a1: First angle a1': First' angle
a2: Second angle a3: Third angle
a4: Fourth angle a5: Fifth angle

The invention claimed is:

1. An apparatus for folding a sealed portion of a pouch-shaped battery cell configured such that an electrode assembly is received in a cell case, electrode leads protrude from one side or opposite sides of the cell case, and the sealed portion is provided at three sides or four sides of an edge of the cell case, the apparatus comprising:
    a lower unit configured to allow the sealed portion to be seated thereon, the lower unit comprising a lower folding block configured to perform horizontal reciprocation and upward and downward movement;
    an upper unit located above the lower unit, the upper unit comprising an upper folding block configured to perform horizontal reciprocation and upward and downward movement and to bend the sealed portion to a first predetermined angle;
    a lower folding guide unit located in front of the lower unit, the lower folding guide unit being configured to perform upward and downward movement and to bend the sealed portion to a second predetermined angle; and
    an upper folding guide unit located in front of the upper unit, the upper folding guide unit being configured to perform upward and downward movement and to bend the sealed portion to a third predetermined angle,
    wherein the upper folding block includes a first upper folding block, a second upper folding block, and a third upper folding block sequentially disposed side by side in a longitudinal direction of the sealed portion, and
    wherein the second upper folding block is disposed so as to protrude farther than the first upper folding block and the third upper folding block in a forward direction and has a longer length relative to lengths of the first upper folding block and the third upper folding block in the forward direction.

2. The apparatus according to claim 1, wherein the first upper folding block, the second upper folding block, and the third upper folding block are independently operable.

3. The apparatus according to claim 1, wherein at least one of the lower folding block or the upper folding block is provided with a heater configured to increase a temperature of the sealed portion to a predetermined temperature.

4. The apparatus according to claim 1, wherein
    the upper folding block has a length in the longitudinal direction of the sealed portion equal to or greater than a length of the sealed portion, and
    a front surface of the upper folding block that faces the sealed portion is configured such that a vertical surface and a first inclined surface inclined as a result of cutting in a downward direction are sequentially disposed from above.

5. The apparatus according to claim 4, wherein
    the lower folding guide unit comprises a lower blade,
    the lower blade has a length equal to or greater than the length of the sealed portion, and
    an inner surface of the lower blade that faces the lower unit is provided with a second inclined surface inclined at a first predetermined inclination angle so as to have a thickness gradually decreasing in an upward direction.

6. The apparatus according to claim 5, wherein
    the upper folding guide unit comprises an upper blade,
    the upper blade has a length equal to or greater than the length of the sealed portion, and
    an outer surface of the upper blade is provided with a third inclined surface inclined at a second predetermined inclination angle as a result of cutting in the downward direction.

7. The apparatus according to claim 6, wherein the upper blade comprises a depressed portion in an inner surface thereof, the depressed portion configured to receive the vertical surface and a part of the first inclined surface upon approach of the upper folding block.

8. The apparatus according to claim 7, wherein the lower blade and the upper blade move upward and downward in a state in which a center axis of the lower blade and a center axis of the upper blade are located on the same vertical line.

9. A method of folding a sealed portion of a pouch-shaped battery cell using an apparatus according to claim 6, the pouch-shaped battery cell configured such that an electrode assembly is received in a cell case, electrode leads protrude from one side or opposite sides of the cell case, and the sealed portion is provided at three sides or four sides of an edge of the cell case, the method comprising:
    a first step of locating the sealed portion on the lower folding block;
    a second step of moving the lower blade upward so as to come into contact with a lower surface of the sealed portion;
    a third step of downwardly moving the upper blade to a space between the lower folding block and the lower blade to bend the sealed portion by a first angle;
    a fourth step of moving the lower folding block upward to bend the sealed portion bent to the first angle by a second angle;
    a fifth step of moving the lower folding block downward;
    a sixth step of moving the upper folding block downward;
    a seventh step of moving the upper folding block forward to bend the sealed portion bent to the second angle by a third angle;
    an eighth step of moving the upper folding block backward;
    a ninth step of moving the lower blade downward and moving the upper blade upward;
    a tenth step of moving the upper folding block upward;
    an eleventh step of moving the lower folding block forward;
    a twelfth step of moving the lower folding block upward; and
    a thirteenth step of moving the upper folding block forward to bend the sealed portion bent to the third angle by a fourth angle.

10. The method according to claim 9, wherein a middle part of the sealed portion is bent before opposite side parts of the sealed portion are bent in the seventh step.

11. The method according to claim 9, further comprising a fourteenth step of moving the upper folding block downward to bend the sealed portion by a fifth angle.

12. The method according to claim 11, wherein
    each of the first angle and the second angle is an obtuse angle, and
    each of the third angle and the fourth angle is an acute angle.

13. The method according to claim 11, wherein the fifth angle is 0°.

* * * * *